United States Patent
Brunet et al.

(10) Patent No.: US 7,941,845 B2
(45) Date of Patent: May 10, 2011

(54) SYSTEMS AND METHODS FOR CONTROLLING PRODUCTION QUANTITIES

(75) Inventors: Jeffrey Brunet, Richmond Hill (CA); Ian Collins, Markham (CA); Yousuf Chowdhary, Maple (CA); Alex Lemelev, Thornhill (CA); Valeriy Kusov, Mississauga (CA)

(73) Assignee: Storage Appliance Corporation, Richmond Hill (CA)

( * ) Notice: Subject to any disclaimer, the term of this patent is extended or adjusted under 35 U.S.C. 154(b) by 865 days.

(21) Appl. No.: 11/977,885

(22) Filed: Oct. 26, 2007

(65) Prior Publication Data
US 2008/0104413 A1    May 1, 2008

Related U.S. Application Data

(60) Provisional application No. 60/854,626, filed on Oct. 27, 2006.

(51) Int. Cl.
*G06F 21/00* (2006.01)
(52) U.S. Cl. .......................................... 726/18; 713/168
(58) Field of Classification Search .................. None
See application file for complete search history.

(56) References Cited

U.S. PATENT DOCUMENTS

| | | | |
|---|---|---|---|
| 6,069,955 A | 5/2000 | Coppersmith et al. | |
| 6,751,729 B1 * | 6/2004 | Giniger et al. | 713/153 |
| 6,957,344 B1 * | 10/2005 | Goldshlag et al. | 713/194 |
| 2004/0260928 A1 * | 12/2004 | Immonen | 713/175 |
| 2005/0188218 A1 | 8/2005 | Walmsley et al. | |
| 2005/0234823 A1 | 10/2005 | Schimpf | |
| 2006/0013402 A1 | 1/2006 | Sutton II, et al. | |

* cited by examiner

*Primary Examiner* — Minh Dinh
(74) *Attorney, Agent, or Firm* — Gard & Kasiow LLP

(57) ABSTRACT

Systems and methods are provided for controlling the number of products produced by contract manufacturers in order to prevent unauthorized overproduction. Each authorized device that is produced includes both a serial number and an encryption of the serial number. Each device is configured to decrypt the encrypted serial number and verify the decrypted serial number matches the serial number before the device will function properly. The encryption of the serial number is performed at a secure location outside of the control of the manufacturer, and the encrypted serial number is then transmitted to the manufacturer and stored to the device. Without knowledge of, or access to, the details of the encryption process, the manufacturer cannot independently produce devices with properly encrypted serial numbers. Accordingly, the number of properly functioning devices the manufacturer can produce can be limited by controlling the number of encrypted serial numbers provided to the manufacturer.

14 Claims, 6 Drawing Sheets

SYSTEMS AND METHODS FOR CONTROLLING PRODUCTION QUANTITIES

CROSS-REFERENCE TO RELATED APPLICATIONS

This application claims the benefit of U.S. Provisional Patent Application No. 60/854,626 filed on Oct. 27, 2006 and entitled "A Method and a System for the Secure Manufacturing of Electronic Devices," incorporated herein by reference.

BACKGROUND OF THE INVENTION

1. Field of the Invention

The present invention relates generally to the field of product manufacturing and more particularly to methods for controlling production quantities.

2. Description of the Prior Art

Increasingly, consumer products are being manufactured under license, often in countries where labor costs are relatively low. While the use of less expensive labor serves to keep manufacturing costs low, placing the production in the hands of overseas manufacturers has lead to certain problems. For example, when an overseas manufacturer is directed to produce a certain quantity of a product, there is little to stop the overseas manufacturer from exceeding the production limit. The excess product can then be sold into unauthorized markets or distribution channels, or can be labeled with a different brand name and sold at a lower price. In either case the licensor is not profiting from the sale of its products, and in the latter case is competing against its own products.

Various approaches have been tried to stem this problem. One solution has been to mark authentic products with either microscopic markings or digital codes. One drawback to this approach, however, is that buyers often cannot distinguish between products that are authentic and those simply manufactured without the microscopic markings or digital codes. Given that the authorized and unauthorized products are otherwise the same, there is little incentive for a buyer to try to draw the distinction. Furthermore, there is little to prevent the licensee from overproducing the products with the proper microscopic markings or digital codes.

SUMMARY

An exemplary method for producing a device comprises obtaining from the device a serial number associated with the device, and sending the serial number over a network connection to an encryption processor in a secure location. The method further comprises generating a unique device identification by the encryption processor encrypting the serial number, and sending the unique device identification from the encryption processor to a manufacturing processor. Further, the method comprises storing, with the manufacturing processor, the unique device identification to the device. Some embodiments of the method further comprise storing the unique device identification in a database and/or storing the serial number in the database. The method can further comprise updating a counter maintained by the encryption processor.

Another exemplary method for producing a device comprises generating in a secure location a batch of unique device identifications by encrypting, for each of a plurality of devices, a serial number for each device. The method also comprises sending the batch of unique device identifications from the secure location to a manufacturing processor. The method further comprises storing to the device a unique device identification from the batch. Some embodiments of the method further comprise storing the unique device identifications in a database and/or storing the serial numbers in the database. The method can further comprise updating a counter maintained by the manufacturing processor.

Systems for controlling the production of devices are also provided. And exemplary system comprises a server and a computer system including a processor. The processor is configured to obtain a serial number associated with a device, send the serial number over a network connection to the server in a secure location, and store a unique device identification to the device. The server is configured to receive the serial number from the processor, generate the unique device identification by encrypting the serial number, and send the unique device identification to the processor over the network connection. In some embodiments, the computer system further includes means for authenticating a production personnel.

An exemplary device of the present invention comprises a serial number, a logical storage area, and firmware. The logical storage area stores a unique device identification in some embodiments. The firmware is configured to read the unique device identification from the logical storage area, decrypt the unique device identification, compare the decrypted unique device identification to the serial number when the device is powered up, and power down the device if the decrypted unique device identification does not match the serial number.

DETAILED DESCRIPTION OF THE INVENTION

The present invention is directed to systems and methods for controlling the number of products that are produced by contract manufacturers in order to prevent unauthorized overproduction. In the various methods of the invention, each authorized device that is produced includes both a serial number and an encryption of the serial number. The device is configured, for example through firmware, to decrypt the encrypted serial number and verify it against the serial number before the device will function properly. The encryption of the serial number is performed at a secure location outside of the control of the manufacturer. The encrypted serial number is then transmitted back to the manufacturer and written to the device. Without knowledge of, or access to, the details of the encryption process, the manufacturer cannot independently produce devices with properly encrypted serial numbers. Accordingly, the number of properly functioning devices produced by the manufacturer can be controlled by limiting the number of serial numbers that are encrypted.

Figure 1:
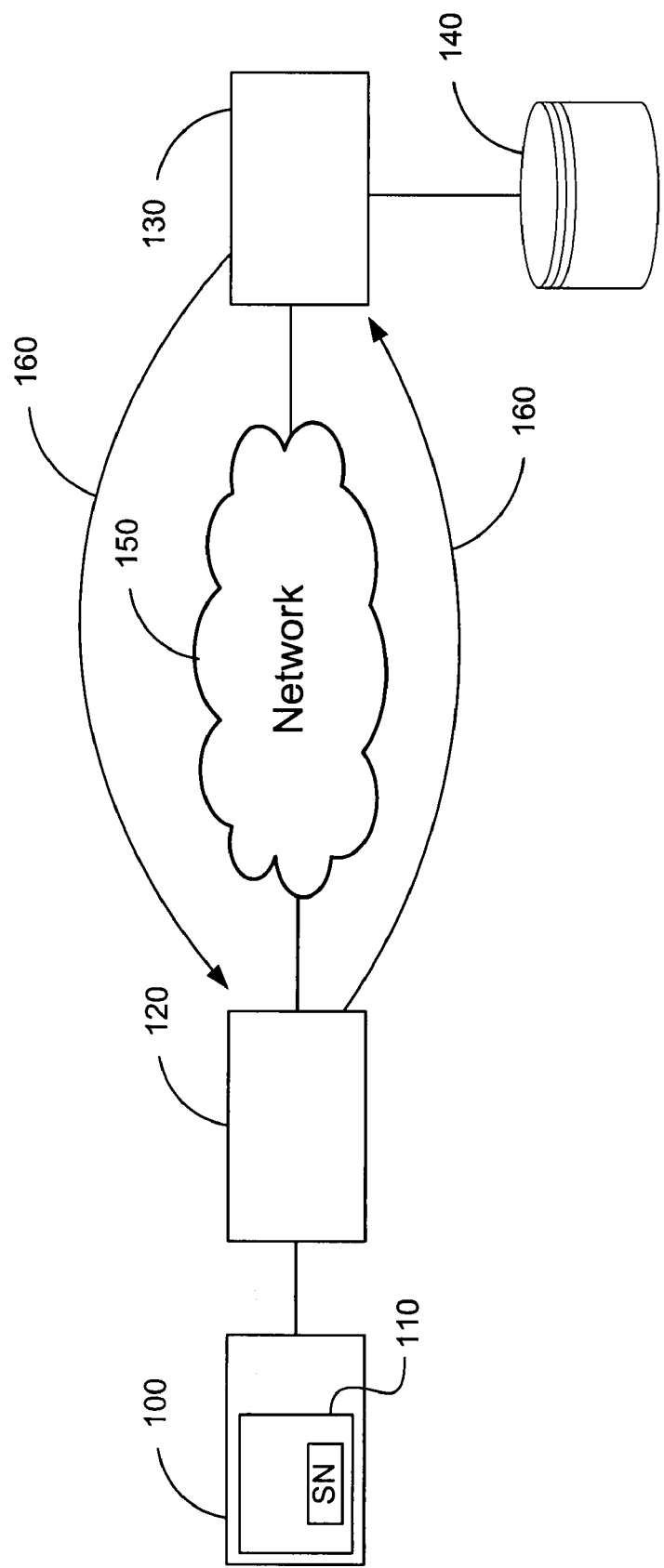
FIG. 1 is a schematic representation of an exemplary system, according to an embodiment of the present invention.

FIG. 1 illustrates an exemplary system of the invention. In the embodiment shown in FIG. 1, a device 100 including one or more components 110 is coupled to a manufacturing processor 120. The manufacturing processor 120 is in communication with an encryption processor 130 which is in further communication with a database 140. The connection between the manufacturing processor 120 and the encryption processor 130 is designed to give the manufacturing processor 120 access to the devices 100 being produced, while the encryption processor 130 is in a secure location that is secure from access and therefore tampering by a manufacturer of the devices 100 being produced.

The manufacturing processor 120 may be in electronic communication with the encryption processor 130 across a network connection through a network 150 such as the Internet, a Local Area Network (LAN), a Wide Area Network (WAN), a proprietary network, or a private network. Alternatively, the manufacturing processor 120 may be in physical communication 160 with the encryption processor 130. For example, passing data between the manufacturing processor 120 and the encryption processor 130 can include recording the data on a physical medium such as a hard disk drive or a flash memory that is physically transported from the manufacturing processor 120 to the encryption processor 130. As another example, data can be printed and sent by facsimile. Some embodiments employ both electronic and physical communication, for instance, data from the manufacturing processor 120 can be electronically communicated to the encryption processor 130, while data moving the opposite direction is sent by courier on a flash memory.

The device 100 can be, for example, an electronic device such as a Video Cassette Recorder (VCR), Digital Versatile Disc (DVD) player, a desktop or laptop computer, a Moving Picture Experts Group Layer-3 Audio (MP3) player, a settop box, a television, a cell phone, a Smartphone, a Personal Digital Assistant (PDA), a Personal Video Recorder (PVR), or a Universal Serial Bus (USB) memory key. Additionally, the device 100 can be a product with some amount of integrated electronics, for instance a toy or a piece of exercise equipment, and that at least includes some electronic memory with the capacity to store the encrypted serial number. Accordingly, the device 100 includes one or more components 110 such as a processor, a hard disk drive, a flash memory, an Electrically Erasable Programmable Read-Only Memory (EEPROM), a display device, or a chipset including Random Access Memory (RAM).

Figure 4:
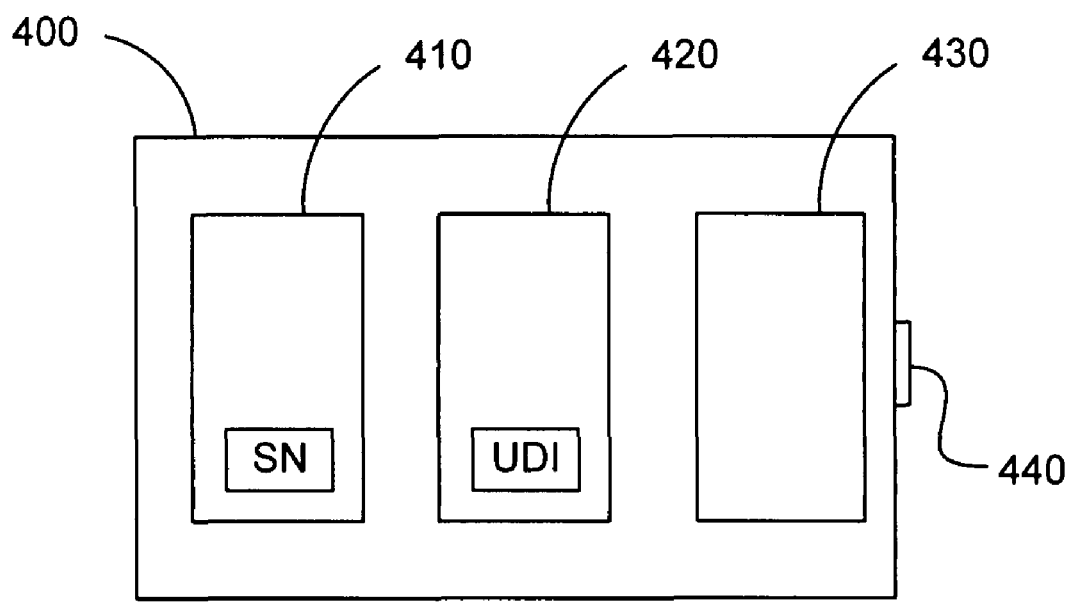
FIG. 4 is a schematic representation of an exemplary device according to an embodiment of the present invention.

A serial number (SN) is associated with the completed device 100 of the present invention, as described, for example, with respect to device 400 of FIG. 4. In some embodiments, the serial number associated with the completed device 100 is a serial number of the component 110. In other embodiments, the serial number is one that becomes associated with the device 100 as the device 100 is being manufactured. For example, the serial number can be assigned to the device 100 as manufacturing begins, or at some later point as the device 100 nears completion. Some methods of the invention, described elsewhere herein, provide the serial number to the device 100.

In some embodiments, the device 100 is coupled to a manufacturing processor 120 after being manufactured, though it will be appreciated that the present invention does not require a completed device 100 at the time that the device 100 is coupled to the manufacturing processor 120, and in some situations it can be beneficial to perform a method of the invention while a device 100 is still in the process of being manufactured. The device 100 can be coupled to the manufacturing processor 120 by a wired connection such as a USB connection, a FireWire connection, or a proprietary connector, while in other embodiments the device 100 can be coupled to the manufacturing processor 120 by a wireless connection such as a WiFi connection.

The manufacturing processor 120 can be a general purpose processor disposed within a system such as a personal computer (PC), or any specially configured processing logic such as an application-specific integrated circuit (ASIC), for example. In some embodiments, the manufacturing processor 120 is part of a system that also incorporates security features to authenticate individuals, such as production personnel, before the manufacturing processor 120 can be fully employed. Security features can include biometric devices such as finger print scanners and iris scanners. Other security features can include password protection, the use of a Personal Identification Number (PIN), and so forth. Uses for authenticating individuals are described elsewhere herein.

In some embodiments, the manufacturing processor 120 is configured to run a secure manufacturing software application. The secure manufacturing software application comprises software or firmware instructions to perform various steps described below in connection with the manufacturing processor 120. For example, the secure manufacturing software application can obtain the serial number from the device 100, or from one or more components 110, once the device 100 is coupled to the manufacturing processor 120.

The encryption processor 130 can be a processor of a server or a PC, in various embodiments. The encryption processor 130 can be in communication with the manufacturing processor 120 across a network connection over the network 150. In some instances the network connection is maintained continuously between the encryption processor 130 and the manufacturing processor 120, while in other embodiments the network connection is established only temporarily for the purpose of communicating between the encryption processor 130 and the manufacturing processor 120. In some embodiments, the manufacturing processor 120 is located within a non-secure location while the encryption processor 130 is located within a secure location. For example, the non-secure location can be a manufacturing facility while the secure location is a corporate headquarters such as that of a licensor contracting to have devices 100 manufactured at the manufacturing facility by a licensee. As another example, the non-secure location can be a warehouse of a distributor, while the secure location is a server farm or the like. The encryption processor 130 in the secure location also does not have to be particularly remote from the manufacturing processor 120, as the secure location could be a cage or a room within the same facility as the manufacturing processor 120, so long as the cage or room provides sufficient security from access by the manufacturer of the devices 100 being produced.

Figure 2:
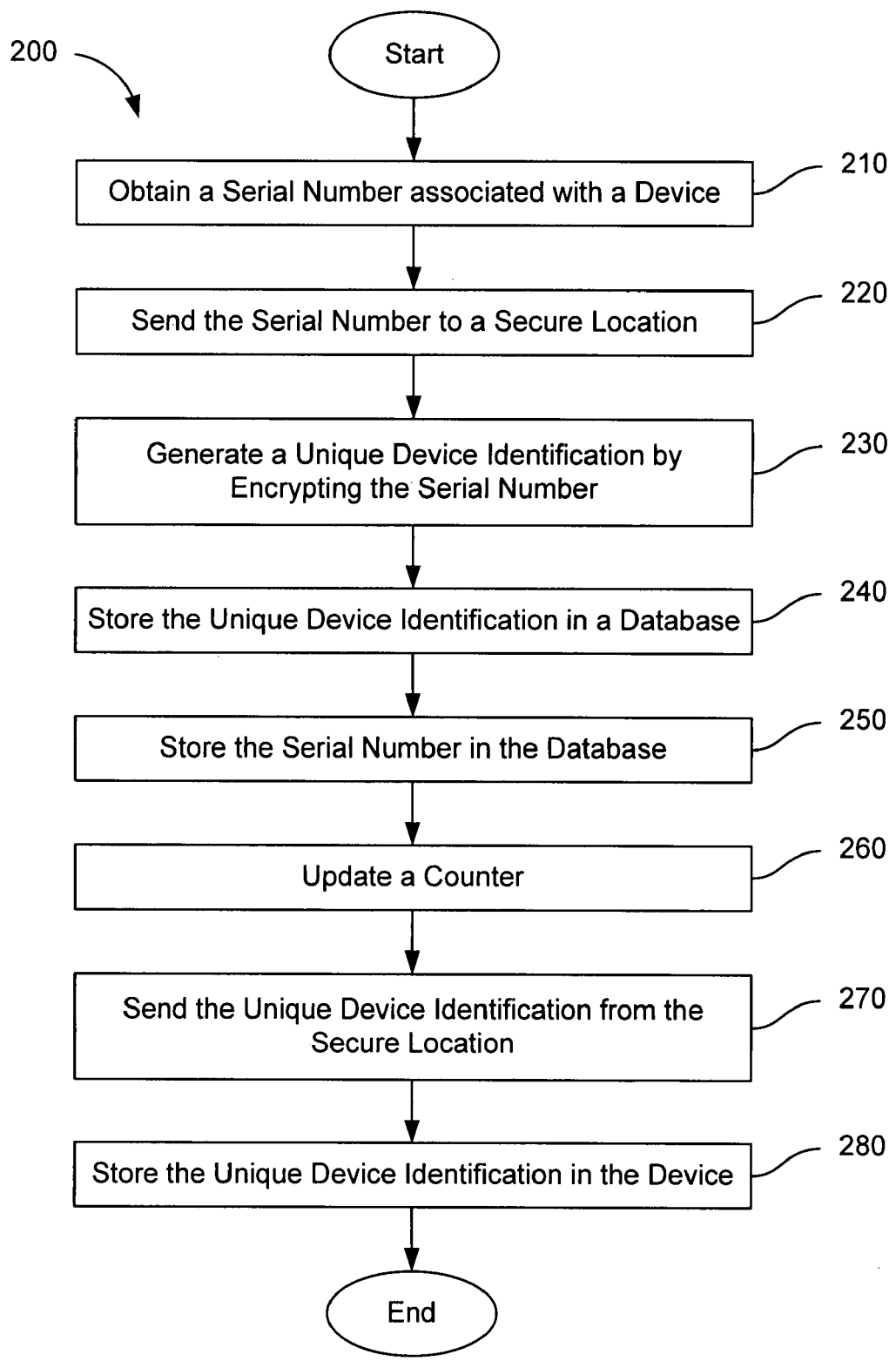
FIG. 2 shows a flow-chart representation of a method for producing a device, according to an embodiment of the present invention.

FIG. 2 is a flow-chart representation of an exemplary method 200 of the invention for producing a device 100 (FIG. 1) associated with a serial number. The method 200 begins by obtaining 210 the serial number from the device 100. The serial number is then sent 220 over a network connection to an encryption processor 130 (FIG. 1) in a secure location. Next, a unique device identification is generated 230 by the encryption processor 130 encrypting the serial number. The unique device identification can be optionally stored 240 in a database 140 (FIG. 1). The serial number can also optionally be stored 250 in the database 140. Further, a counter can also be updated 260. The unique device identification is sent 270 from the encryption processor 130 to a manufacturing processor 120 (FIG. 1) and the manufacturing processor 120 then stores 280 the unique device identification to the device 100. Certain steps of the method 200 are further elaborated upon below.

The serial number can be obtained 210 from the device 100 after the device 100 is at least partially completed. For some devices 100, obtaining 210 the serial number can comprise requesting the serial number from the device 100 and receiving the serial number back in response. For other devices 100 that lack the logic to receive a query and produce a response, obtaining 210 the serial number can comprise reading the serial number, for example, with a barcode reader.

Sending 270 the unique device identification from the encryption processor 130 to the manufacturing processor 120 can also be performed in a number of different ways. In some instances the unique device identification is sent 270 individually across a network connection. In other instances, the unique device identification is sent 270 within a batch of unique device identifications, either electronically or physically.

Updating 260 the counter serves to keep track of the number of devices 100 that have already been produced, or that are still authorized to be produced. In some embodiments the counter is maintained in the database 140 by the encryption processor 130 and updating 260 the counter comprises incrementing or decrementing the counter each time another serial number is encrypted.

Figure 3:
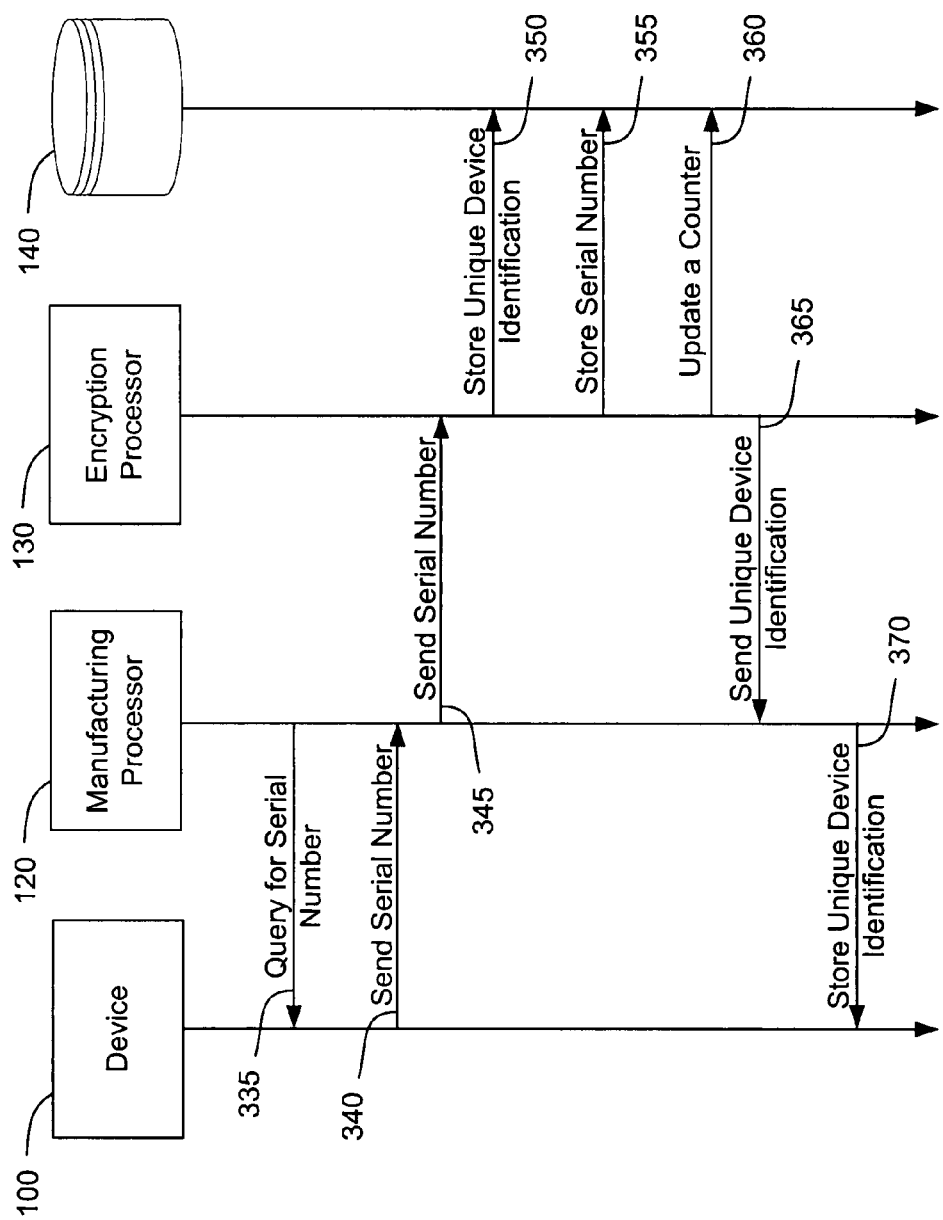
FIG. 3 shows, for the method illustrated by FIG. 2, exemplary communications exchanged according to an embodiment of the present invention.

FIG. 3 further illustrates an embodiment of the method 200 through a series of exemplary communications exchanged between the device 100, the manufacturing processor 120, the encryption processor 130, and the database 140. Initially, either during the assembly of the device 100, or some time after the device 100 has been fully assembled, the device is coupled to the manufacturing processor 120. The manufacturing processor 120 then obtains 210 (FIG. 2) a serial number by querying 335 the device 100 for the serial number. The device 100 sends 340 the serial number to the manufacturing processor 120 in response.

Once the manufacturing processor 120 has obtained the serial number, the manufacturing processor 120 sends 345 (see 220 of FIG. 2) the serial number across a network connection through a network 150 (FIG. 1) to the encryption processor 130 in a secure location. The encryption processor 130 generates 230 (FIG. 2) a unique device identification from the serial number. The unique device identification is generated by encrypting the serial number, for example, by using a private key. Other serial numbers associated with the device 100, as well as various alphanumeric values, such as the manufacturing date can also be encrypted with the serial number to generate the unique device identification. After the unique device identification has been generated 230, the unique device identification can be optionally stored 350 (see 240 of FIG. 2) in the database 140, for later reference. Optionally, the encryption processor 130 can store 355 (see 250 of FIG. 2) the serial number to the database 140 also for later reference.

An optional counter maintained in the database 140 can be updated 360 (see 260 of FIG. 2). Here, the counter can be used to keep track the number of devices 100 that have already been produced, or that are still authorized to be produced. Updating 360 the counter can comprise either incrementing or decrementing the counter. For example, the counter can be initially set to a number of devices 100 that have been authorized for a production run, the counter can be decremented with each unique device identification generated, and when the counter reaches zero no further unique device identifications will be generated. Likewise, the counter can be initially set to zero, incremented with each unique device identification generated, and when the counter equals the authorized number of devices 100 for the production run no further unique device identifications will be generated. Thus, in some embodiments generating 230 (FIG. 2) the unique device identification can include verifying that the unique device identification is permitted by comparing the counter against a threshold, such as zero or the authorized number of devices 100.

After the unique device identification has been generated 230 (FIG. 2), the unique device identification is sent 365 (see 270 of FIG. 2) from the encryption processor 130 back across the network connection to the manufacturing processor 120. The manufacturing processor 120 receives and stores 370 (see 280 of FIG. 2) the unique device identification in a logical storage area of the device 100. The unique device identification can be stored 370, for example, to a hidden area of the device 100 such as a hidden folder so that a subsequent user cannot access and/or alter the unique device identification.

Although FIGS. 2 and 3 suggest that the various steps proceed in a particular order, it will be understood that the orders of some of the steps can be different than those shown. In particular, storing 240 the unique device identification in the database, storing 250 the serial number in the database, and updating 260 the counter can occur in any order. Likewise, any of the preceding steps can be performed before, after, or contemporaneously with sending 270 the unique device identification from the secure location.

FIG. 4 illustrates an exemplary device 400 of the present invention. The device 400 comprises a component 410 including a serial number (SN) and a logical storage area 420 that stores a unique device identification (UDI). The device 400 is also configured to read the unique device identification from the logical storage area 420, decrypt the unique device identification, compare the decrypted unique device identification against the serial number when the device 400 is powered up, and power down the device 400 if the decrypted unique device identification is missing or not the same as the serial number. These steps can be performed, for example, by firmware 430, software (not shown), or a combination thereof. The device 400 optionally includes a connector 440 to allow the device 400 to be coupled to a manufacturing processor such as manufacturing processor 120 (FIG. 1). Alternatively, the device 400 can include a wireless communication electronics to make a wireless connection to the manufacturing processor.

It should be noted that although the component 410, the logical storage area 420, and the firmware 430 are represented separately in FIG. 4, in some embodiments any two or all three may be combined. Thus, for example, the device can be a flash memory chip that includes both the serial number and a logical storage area that stores the unique device identification. It should also be noted that in some embodiments the device itself, rather than the component 410 thereof, comprises the serial number.

The unique device identification can also be an encryption of a serial number in combination with another serial number associated with the device 100 or an alphanumeric value that is not a serial number, such as the manufacturing date or a random number. In some of these embodiments, the value is stored unencrypted by the device 400, such as in the logical storage area 420. In one example, the firmware 430 and/or software is configured to decrypt the encrypted combination and employ the value to extract the serial number from the combination. In other embodiments, the firmware 430 and/or software is configured to extract the serial number from the decrypted combination without accessing the value.

As noted, when a device 400 is first powered up, the firmware 430 and/or the software is configured to power down the device 400 if the decrypted unique device identification does not match the serial number or if the unique device identification is missing. The present invention is effective, therefore, to prevent the unauthorized overproduction of devices 400 by the manufacturer. For example, in the event the manufacturer produces an excess quantity of devices 400, such unauthorized devices 400 will not receive unique device identifications if coupled to the manufacturing processor 120 (FIG. 1). Therefore, these devices 400 are prevented by their firmware from operating properly. If the manufacturer attempts to store a fake unique device identification in the logical storage area 420 of a device 400, upon power-up the firmware 430 and/or software will derive a fake serial number from the fake unique device identification. The firmware 430 and/or software will then determine that the fake serial number does not match the serial number from the component 410 and power down the device 400, again preventing the device 400 from operating properly.

In addition to checking the unique device identification at power-up, the unique device identification can also be verified at other times. For example, the unique device identification and/or the serial number can be verified against the same stored by the database 150 (FIG. 1) whenever a software or firmware update is requested by the device 400. In these situations, should the unique device identification and/or serial number not match the same stored in the database 150, a firmware update can be downloaded to the firmware 430 where the update is configured to power down or otherwise disable the device 400.

In the embodiments described with respect to FIGS. 2 and 3, a network connection is generally maintained between the manufacturing processor 120 and the encryption processor 130 over an extended period of time as successive devices 100 are processed. The present invention also provides for methods in which the network connection is made briefly, or is replaced by a physical communication. In these further methods, unique device identifications are sent in batches from the encryption processor 130 to the manufacturing processor 120. In embodiments in which the network connection is made briefly, the network connection is made long enough to send the batch of unique device identifications.

Figure 5:
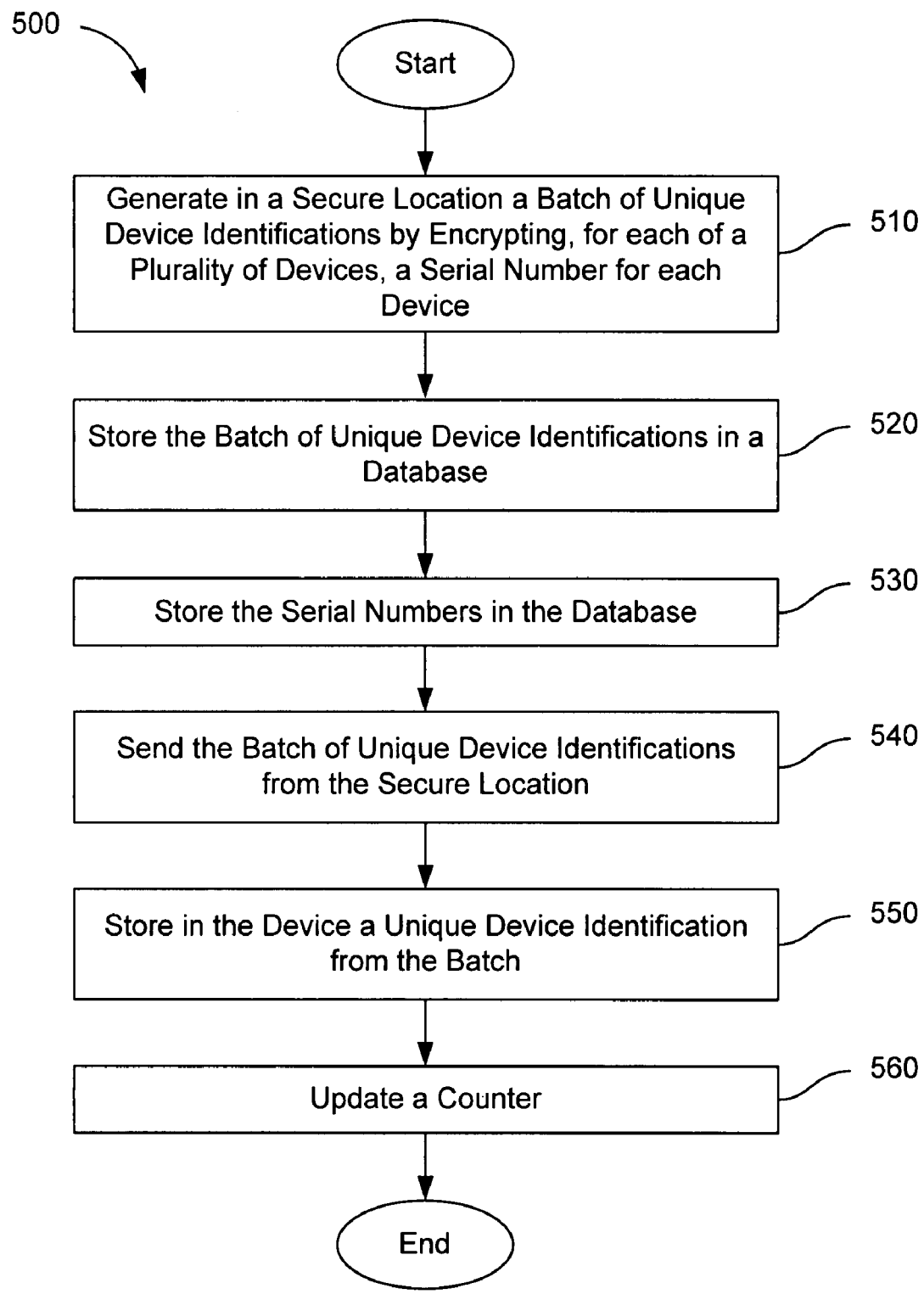
FIG. 5 shows a flow-chart representation of a method for producing a device, according to another embodiment of the present invention.

FIG. 5 is a flow-chart representation of an exemplary method 500 of the invention that employs such batches for producing a device 100 (FIG. 1) associated with a serial number. The method 500 begins by generating 510 in a secure location a batch of unique device identifications. The unique device identifications are generated 510 by the encryption processor 130 (FIG. 1) which encrypts a plurality of serial numbers to generate 510 the batch of unique device identifications. At the time that the unique device identifications are generated 510, the serial numbers are either already associated with specific devices 100 and the serial numbers have been provided in advance to the encryption processor 130, else the serial numbers are generated by the encryption processor 130 and subsequently associated with devices 100.

Optionally, the batch of unique device identifications can be stored 520 in the database 140 (FIG. 1). The serial numbers that were encrypted to produce the batch can also optionally be stored 530 in the database 140. It will be appreciated that the serial numbers, in some embodiments, are stored 530 in the database 140 before the batch of unique device identifications are generated 510 and later read from the database 140 at the time the batch is generated 510. This can occur, for example, where the serial number associated with each device 100 is known in advance. In other embodiments the encryption processor 130 both generates a serial number and encrypts the serial number. In these embodiments the serial numbers are stored 530 after, or contemporaneous with, generating 510 the batch of unique device identifications.

After generating 510 the batch of unique device identifications, the batch of unique device identifications is sent 540 from the secure location to a manufacturing processor 120 (FIG. 1). Here, sending 540 from the secure location to the manufacturing processor 120 can comprise either electronic or physical communication of the batch from the encryption processor 130 to a manufacturing processor 120. In some embodiments, the batch of unique device identifications is sent 540 together with the corresponding serial numbers, for instance in a table. In those embodiments where the serial numbers were associated with the devices 100 before the batch was generated 530, the correspondence between serial numbers and unique device identifications can be later used to find the appropriate unique device identification for a particular device 100.

After the manufacturing processor 120 has received the batch of unique device identifications, a unique device identification from the batch is stored 550 to the device 100. In those embodiments where the serial numbers were associated with the devices 100 before the batch was generated 530, storing 550 the unique device identification to the device 100 can comprise obtaining the serial number from the device and cross-referencing the serial number against a table of unique device identifications to find the particular unique device identification for the device 100. In other embodiments, where the encryption processor 130 generates both the serial number and the unique device identification, storing 550 the unique device identification to the device 100 can also comprise storing the serial number to the device.

Optionally, the method 500 can also comprise updating 560 a counter maintained by the manufacturing processor 120, as opposed to the counter maintained by the encryption processor 130 in method 200. As in the method 200, the counter tracks the number of devices 100 that have already been produced, or that are still authorized to be produced. In some embodiments, the counter is incremented or decremented every time a unique device identification is stored 550 to a device 100. In some of these embodiments, storing 550 the unique device identification to the device 100 includes checking the counter against a threshold to determine whether the unique device identification should be stored 550.

With reference to both methods 200 and 500, the manufacturing processor 120 can be part of a system that includes a security feature to authenticate individuals, such as production personnel. In some embodiments, only a limited number of devices 100 will be allowed to be produced following the authentication of an authorized individual. To produce further devices 100 beyond the limited number, an authorized individual would have to be authenticated again.

For example, the encryption processor 130 can be configured to receive confirmation of an authentication, reset an authentication counter in response thereto, and increment the authentication counter each time a unique device identification is generated 230 (FIG. 2). The encryption processor 130 can be further configured to compare the authentication counter against a threshold equal to the limited number of devices 100 that will be allowed to be produced per authentication, and to not permit further unique device identifications to be generated 230 if the authentication counter equals the threshold. Similarly, with respect to the method 500 (FIG. 5), the manufacturing processor 120 can be configured to receive confirmation of an authentication, reset an authentication counter in response thereto, and increment the authentication counter each time a unique device identification is stored 550 (FIG. 5). The manufacturing processor 120 can be further configured to compare the authentication counter against a threshold equal to the limited number of devices 100 that will be allowed to be produced per authentication, and to not permit further unique device identifications to be stored 550 if the authentication counter equals the threshold.

Figure 6:
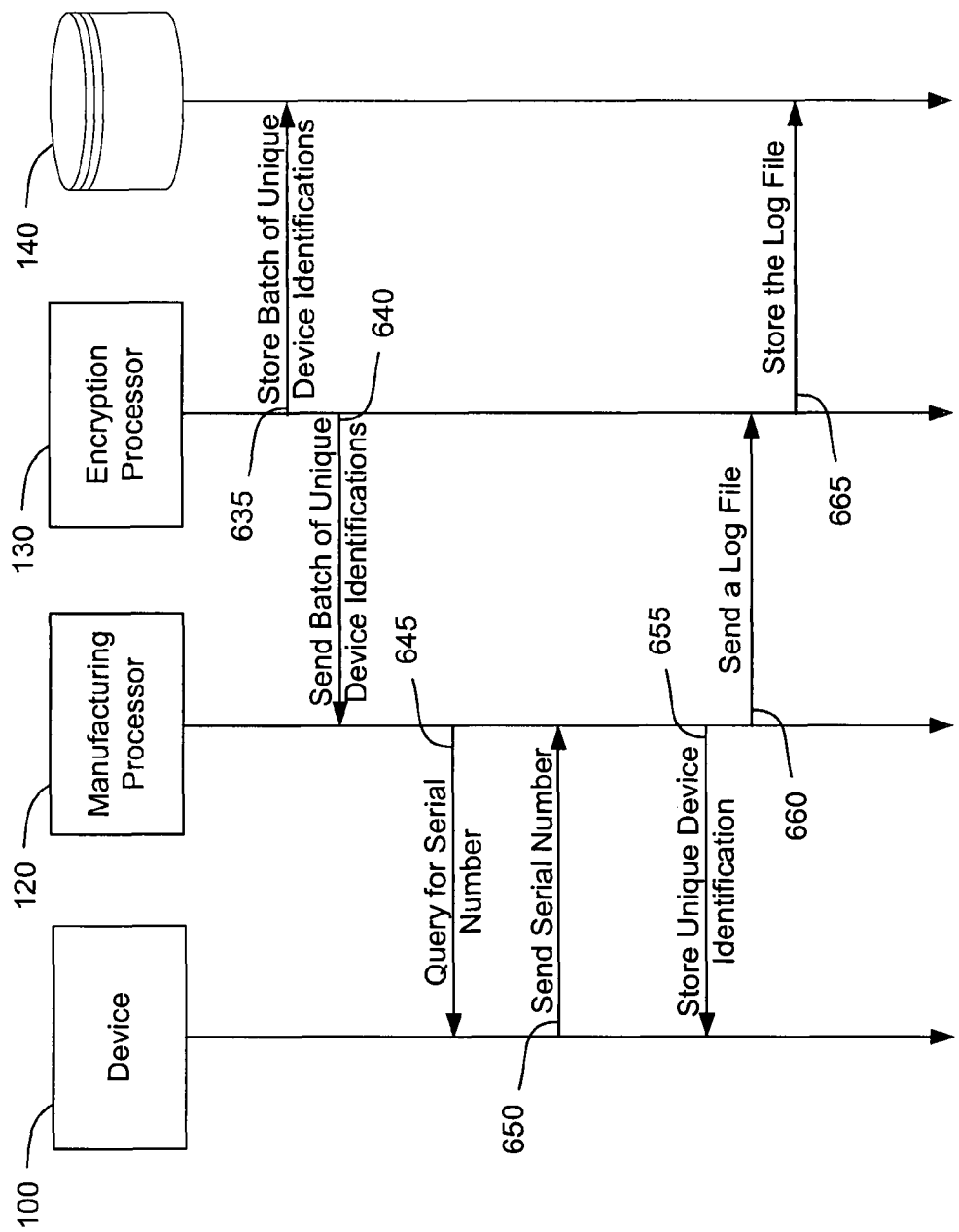
FIG. 6 shows, for the method illustrated by FIG. 5, exemplary communications exchanged according to an embodiment of the present invention.

FIG. 6 illustrates an embodiment of the method 500 through a series of exemplary communications exchanged between a device 100, a manufacturing processor 120, an encryption processor 130, and a database 140. Initially, the encryption processor 130 generates 510 (FIG. 5) a batch of unique device identifications. In some instances, the encryption processor 130 has access to serial numbers already associated with a plurality of devices 100. The encryption processor 130 can read the serial numbers from the database 140, some other database (not shown), or may have the serial numbers in RAM at the time the batch of unique device identifications is generated 510.

Once the batch of unique device identifications has been generated 510, the encryption processor 130 optionally stores 635 (see 520 of FIG. 5) the batch in the database 140 for later reference and sends 640 (see 540 of FIG. 5) the batch to the manufacturing processor 120. Sending 640 the batch to the manufacturing processor 120 can be performed electronically or physically, as described above. In the case where the batch is sent electronically, over a network connection, the network connection can be temporarily established long enough for the batch to be sent 640.

In the example of FIG. 6, once the batch of unique device identifiers has been sent to the manufacturing processor 120, the device 100 is coupled to the manufacturing processor 120. Next, the manufacturing processor 120 optionally queries 645 the device 100 for the serial number and in these embodiments the device 100 sends 650 the serial number back to the manufacturing processor 120. In those embodiments were the encryption processor 130 both generates and encrypts the serial numbers, querying 645 the device 100 and sending 650 the response are omitted.

The manufacturing processor 120 then stores 655 (see 550 of FIG. 5) to the device 100 a unique device identification from the batch. In those embodiments in which the manufacturing processor 120 queried 645 for the serial number, the manufacturing processor 120 can use the serial number to find the appropriate unique device identification from the batch for the particular device 100. In other embodiments, however, the order of the devices 100 and the unique device identifications in the batch are coordinated so that the manufacturing processor 120 does not need to obtain the serial number from each device 100 in order to store 655 the correct unique device identification to that device 100. In still other embodiments, the serial number only becomes associated with a device 100 when both the unique device identification and the serial number are stored 655 to the device 100.

Optionally, a counter maintained by the manufacturing processor 120 is updated 560 (FIG. 5) with each unique device identification that is stored 655 to a device 100. The manufacturing processor 120 repeats the process of storing 655 unique device identifications to devices 100 until either the batch has been completely exhausted or the optional counter reaches a threshold indicating that no more devices 100 are authorized to be produced. As part of each cycle, the manufacturing processor 120 can also update a log file that can record, for example, the date and time that a unique device identification is stored to a device, along with the unique device identification and the relevant serial numbers. After a batch of unique device identifications have been used, the log file can be sent 660, either electronically or physically, to the encryption processor 130. The encryption processor 130 can then store 665 the log file to the database 140.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method for producing a device comprising:
    obtaining, with a manufacturing processor, from the device a serial number associated with the device;
    sending, with the manufacturing processor, the serial number over a network connection to an encryption processor in a secure location;
    generating a unique device identification by the encryption processor encrypting the serial number;
    sending the unique device identification from the encryption processor to the manufacturing processor; and
    storing, with the manufacturing processor, the unique device identification to the device.

2. The method of claim 1 further comprising storing the unique device identification in a database.

3. The method of claim 1 further comprising storing the serial number in a database.

4. The method of claim 1 further comprising updating a counter maintained by the encryption processor.

5. The method of claim 4 wherein generating the unique device identification includes comparing the counter to a threshold to verify that the unique device identification is permitted to be generated.

6. The method of claim 1 wherein obtaining the serial number from the device includes obtaining the serial number from a. component of the device.

7. The method of claim 1 wherein obtaining the serial number from the device includes querying the device for the serial number and receiving the serial number from the device in response.

8. The method of claim 1 wherein generating the unique device identification by encrypting the serial number further includes encrypting another alphanumeric value.

9. The method of claim 1 wherein sending the unique device identification from the encryption processor to the manufacturing processor includes sending the unique device identification electronically.

10. The method of claim 9 wherein sending the unique device identification electronically comprises sending the unique device identification over the network connection.

11. The method of claim 1 wherein sending the unique device identification includes writing the unique device identification to a memory device, sending the memory device to a non-secure location having the manufacturing processor, and coupling the memory device to the manufacturing processor.

12. The method of claim 1 wherein storing the unique device identification to the device includes storing the unique device identification to a hidden area of the device.

13. A system for controlling the production of devices comprising:
   a computer system including a manufacturing processor configured to
   obtain from a device a serial number associated with the device,
   send the serial number over a network connection to a server in a secure location, and
   store a unique device identification to the device;
   the server configured to
   receive the serial number from the manufacturing processor,
   generate the unique device identification by encrypting the serial number, and
   send the unique device identification to the manufacturing processor over the network connection.

14. The system of claim 13 wherein the computer system is further configured to authenticate a production personnel.

* * * * *